United States Patent [19]

Bornschein

[11] Patent Number: 4,875,185
[45] Date of Patent: Oct. 17, 1989

[54] WORKSTATION FOR A VISION-IMPAIRED USER WITH INTERFACE FOR SELECTIVELY FEEDING DISPLAY DATA FROM A BUS OR A CONNECTED COMPUTER

[75] Inventor: Hans-Jürgen Bornschein, Schwerte, Fed. Rep. of Germany

[73] Assignee: F. H. Papenmeier GmbH & Co. KG, Schwerte, Fed. Rep. of Germany

[21] Appl. No.: 931,674

[22] Filed: Nov. 17, 1986

[30] Foreign Application Priority Data

Nov. 18, 1985 [DE] Fed. Rep. of Germany ....... 3540878
Mar. 7, 1986 [DE] Fed. Rep. of Germany ....... 3607549

[51] Int. Cl.⁴ .......................... G06F 13/38; G06F 3/14
[52] U.S. Cl. .................................. 364/900; 364/927.2; 364/927.92; 364/926.1; 364/942.8; 364/710.12; 340/825.19
[58] Field of Search ... 364/200 MS File, 900 MS File, 364/706, 709, 710

[56] References Cited

U.S. PATENT DOCUMENTS

| | | | |
|---|---|---|---|
| 3,937,884 | 2/1976 | Richez | 381/44 |
| 4,037,200 | 7/1977 | Cranmer | 340/166 R |
| 4,106,101 | 8/1978 | Harrison | 364/709 |
| 4,158,196 | 6/1979 | Crawford, Jr. | 340/163 |
| 4,334,280 | 6/1982 | McDonald | 364/710.12 |
| 4,404,554 | 9/1983 | Tweedy, Jr. et al. | 340/709 |
| 4,406,998 | 9/1983 | Willough | 340/815.01 |
| 4,408,192 | 10/1983 | Ward et al. | 340/407 |
| 4,458,238 | 7/1984 | Learn | 340/365 R |
| 4,488,146 | 12/1984 | Burchart | 340/407 |
| 4,558,315 | 12/1985 | Weiss et al. | 340/825.19 |
| 4,644,339 | 2/1987 | Ruder | 340/731 |
| 4,648,052 | 3/1987 | Friedman et al. | 364/550 |
| 4,651,145 | 3/1987 | Sutter | 340/706 |
| 4,683,550 | 7/1987 | Jindrick et al. | 364/709.1 |
| 4,713,535 | 12/1987 | Rhoades | 340/365 P |
| 4,746,913 | 5/1988 | Volta | 340/825.19 |

FOREIGN PATENT DOCUMENTS

| | | | |
|---|---|---|---|
| 2136617A | 9/1984 | United Kingdom | 340/825.19 |
| 2145257A | 3/1985 | United Kingdom | 340/825.19 |

OTHER PUBLICATIONS

"New Developments in Handicapped Access", by Peter Bates, Creative Computing, Mar. 1985, pp. 124–126.

"Custom Console for Visually Handicapped", IBM Tech. Disclosure Bulletin, vol. 24, No. 7B Dec. 1981, pp. 3995–3997.

Primary Examiner—Archie E. Williams, Jr.
Assistant Examiner—Eric Coleman
Attorney, Agent, or Firm—Cohen, Pontani & Lieberman

[57] ABSTRACT

The information inspection system for data-processing equipment for the obtaining of electric signals representing auditory, visual and/or tactile information for vision-impaired typists has an interface which "listens-in" in the data bus of an electronic computer or an automated typewriter and thus scans the transmitted data practically without power and without affecting the operation of the data-processing equipment, and feeds same to the end device for the vision-impaired where they are presented in visual, auditory and/or tactile form. No special modification of the hardware and/or software of the data-processing equipment, and therefore of the automated typewriter or the electronic computer, is necessary.

18 Claims, 2 Drawing Sheets

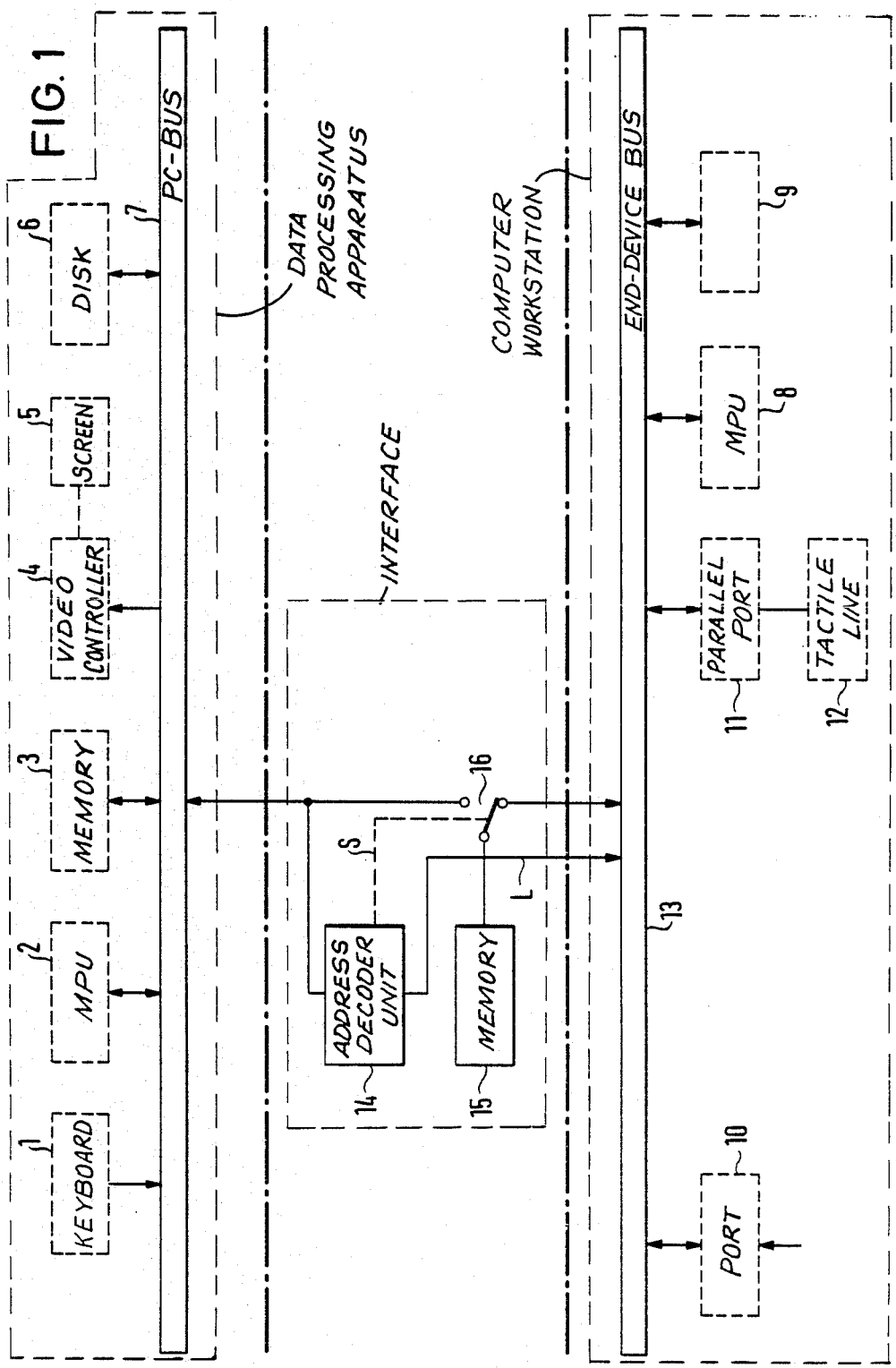

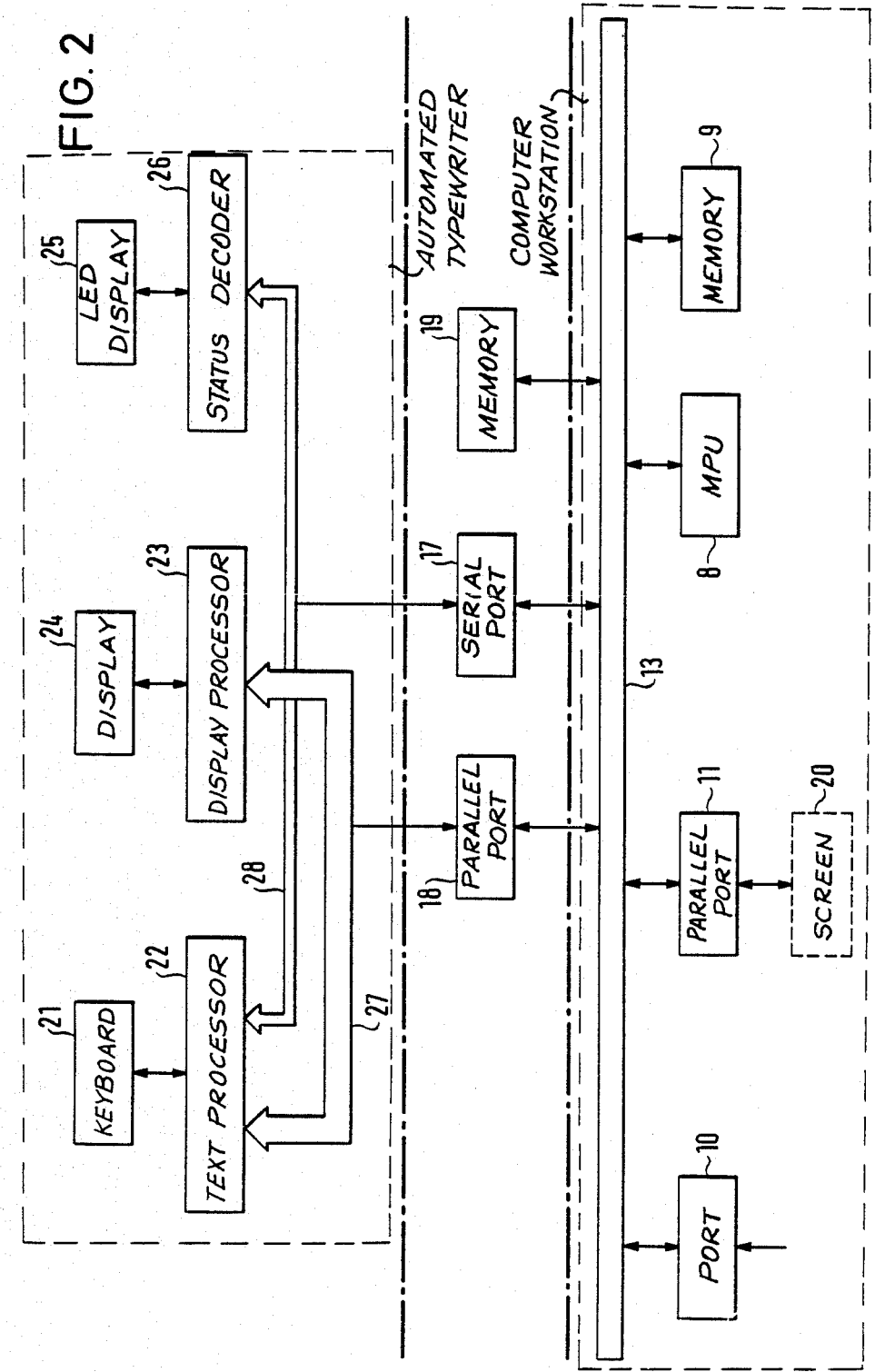

WORKSTATION FOR A VISION-IMPAIRED USER WITH INTERFACE FOR SELECTIVELY FEEDING DISPLAY DATA FROM A BUS OR A CONNECTED COMPUTER

BACKGROUND OF THE INVENTION

The present invention relates to an information-inspection system for data-processing equipment for obtaining electric signals representing auditory, visual and/or tactile information for vision-impaired typists, of the type indicated in the preamble to claim 1.

Various information systems for data-processing equipment in particular electric automated typewriters or electronic computers, for instance personal computers, have been developed which deliver electric signals in a form of presentation which can be noted by vision-impaired typists, namely, depending on the degree of impairment in vision, in visual, auditory and/or tactile form.

These information inspection systems are developed as an expansion of the existing hardware of an electric automated typewriter or electronic computer and have an interface which is connected to the data bus of the automated typewriter or electronic computer; for the reliable operation of this interface a modification of the software of the automated typewriter or of the electronic computer is, however, necessary in order that the characters or control information, for instance status reports, can be presented audibly, visually or tactilely by the end devices, corresponding to the degree of impairment of vision of the operator. The disadvantage in the use of such an interface, which is generally arranged as a pluggable board within the housing of the automated typewriter, electronic computer or keyboard of the electronic computer, resides in the fact that, as a general rule, the operating software of the automated typewriter or of the electronic computer must also be modified; this leads to the result that in most cases the software for the electronic computer or automated typewriter, which is available in most cases at moderate cost and in large diversity, no longer operates reliably.

SUMMARY OF THE INVENTION

The object of the invention is therefore to provide an information inspection system for data-processing equipment of the type indicated in which the above-mentioned disadvantages no longer occur.

In particular, there is to be provided an information inspection system in which signals for the audible, visual and/or tactile presentation of the data, characters and/or status reports can be obtained even without modification of the customary proven software of the data-processing equipment, particularly an automated typewriter or an electronic computer, at little expense for apparatus or electronics.

This object is achieved by the features set forth in the body of claim 1.

Suitable embodiments are defined by the features set forth in the subordinate claims.

The advantages obtained by the invention are based, in particular, on the fact that the information inspection system "listens in" to the data flow of the data-processing system, in particular an automated typewriter or an electronic computer, via the data bus thereof in such a manner that the scanning of said data and the forwarding thereof to the device for the vision-impaired is not noted by the electronic system of the data-processing equipment itself, i.e. the operation of the data-processing system continues undisturbed during the scanning of this data via the interface. In this connection, no special modification of the customary standard software of the data-processing equipment is necessary, i.e. all customary programs which have been developed for these machines and, in particular, also personal computers, remain operable without change so that no additional expense results for the modification of the standard software obtainable.

This "listening-in" to the data on the data bus of the data-processing equipment is effected suitably by powerless scanning of this flow of data for the production of corresponding electric signals which, in their turn, are fed to the connected end device for the vision-impaired and presented there in audible, visual and/or tactile form, i.e. the vision-impaired person can directly note and use the data flow of the data-processing equipment. The data of interest here are essentially characters and/or status reports.

BRIEF DESCRIPTION OF THE DRAWING

The invention will be explained in further detail below on basis of various embodiments with reference to the accompanying diagrammatic drawings, in which:

FIG. 1 is a block diagram of an information inspection system for a PC personal computer which is connected to an end device for the vision-impaired impaired with tactile output, and FIG. 2 shows an information inspection system for an automated typewriter which is connected to an end device for the vision-impaired with visual output, namely a picture screen.

DESCRIPTION OF THE PREFERRED EMBODIMENTS

FIG. 1 shows, in the form of a block diagram, an electronic computer, namely a PC personal computer having a PC bus which is connected via an interface to an end device for the vision-impaired with tactile output. The electronic computer has the customary main stages, namely a keyboard 1 for the inputting of data, characters and control commands, a microprocessor (MPU) 2, a memory 3, a video controller 4 for the controlling of a picture screen 5 and a diskette station 6 serving as mass storage. These components are connected directly to the PC bus 7 in the manner which can be noted from FIG. 1.

The electronic computer is connected via an interface to the workstation or end device for the vision-impaired, which also contains the customary components, namely a microprocessor (MPU) 8, a memory 9, a port 10 for the prompts for the vision-impaired persons, a parallel port 11 and a tactile line by which the characters are presented linewise by protruding pins in Braille format.

The interface contains an address decoder unit 14 which is connected directly to the PC bus 7. Furthermore, via the switch 16 there is a connection to the PC bus 7 with the memory 15. The switch 16 is controlled by the address decoder 14, as indicated in FIG. 1 by the control line S.

The inputting of data is effected in the customary manner by the operator of the PC personal computer via the keyboard 1. The data flow and control also take place in the manner customary for such a personal computer, so that this need not be explained again here.

If the electronic computer accesses its video controller 4 for the controlling of the picture screen 5, the address decoder 14 notes this. A control command for the switch 16 is produced. Upon access of the electronic computer to its video controller 4 the memory 15 of the interface is thus switched to the PC bus 7. The corresponding video data are thus stored in the memory 15 of the interface in parallel like the data in the video controller.

When the access to the video controller 4 of the electronic computer is at an end, the switch 16 is switched back by the address decoder 14 and in this way the memory 15 is again connected to the end-device bus 13. The accesses from the interface to the PC bus 7 however take precedence.

The video data of the electronic computer are practically powerless, i.e. tapped off with high ohmic impedance so that they do not interfere with the operation of the electronic computer, and stored in the memory 15. After the termination of the access to the video controller 4, this memory is available to the end device for the vision-impaired. A release line L from the address decoder advises the end device of the position of the switch.

On the end device for the vision-impaired the data from the memory 15 are presented to the vision-impaired person on the tactile line 12 via his prompt over the parallel port 11.

For non-vision-impaired persons, the data movements continue on the picture screen 5 of the electronic computer, i.e. he can read the corresponding data.

FIG. 2 shows an embodiment of an information inspection system in which the workstation or end device for the vision-impaired does not contain a tactile line 12 but, instead of this, a picture screen 20 for a visual showing which is adapted to the impairment of vision. Furthermore, the end device for the vision-impaired has the construction which can already be noted from FIG. 1 and is connected via an interface to a traditional electric automated typewriter.

This automated typewriter has a keyboard 21, a text processor 22, a display processor 23 for the control of a display 24, either a line display or a picture screen, an LED display 25 and a status decoder 26; the text processor 22 is connected to the display processor 23 via the display processor bus 27 and is connected to the status decoder 26 via the status display bus 28.

The interface between the electric automated typewriter and the end device for the vision-impaired has a serial port 17, a parallel port 18 and a memory 19 which corresponds essentially to the memory 15 in the embodiment shown in FIG. 1.

The parallel port 18 of the interface lies between the display processor bus 27 and the end-device bus 13, while the serial port 17 is connected between the status display bus 28 and the end-device bus 13. The memory 19 is connected directly to the end-device bus 13.

As soon as data are exchanged, via the display processor bus 27, between the text processor 22 and the display processor 23, namely data which are to be presented on the display 24, the interface takes these data up via the parallel port 18 and conducts them to the end-device bus so as to store them in the memory 19.

The status reports which are transmitted on the status report bus 18 between the text processor 22 and the status decoder 26 are taken up in corresponding manner by the serial port 17 and fed to the end device bus 13 so as to again be stored in the memory 19.

All data of the electric automated typewriter essential for the end device for the vision-impaired are therefore taken over via the interface in parallel or series into the end device for the vision-impaired. The taking over of the data which are moved on the display processor bus 7 and the status display bus 8 is effected by way of priority in the memory 19, but in this case, however, without special decoding-out of addresses since all data on these buses are important for the end device for the vision-impaired.

The data movements are presented to the vision-impaired person here, via a prompt from the memory 19 of the interface via the parallel port 11, on the picture screen 20 of this end device for the vision-impaired in large letters so that vision-impaired persons who still have some degree of vision can read and further process the data.

I claim:

1. A computer workstation for a vision-impaired user for connection to a data processing apparatus which includes a microprocessor, data input means, memory storage means, visual output means and at least a data bus connecting said microprocessor, data input means, memory storage means and visual output means for transmission of data therebetween, said workstation comprising:

a workstation microprocessor;

main memory means for storing data:

display means for representing at least one of auditory, visual and tactile information for recognition by a vision-impaired user; and interface means for connecting said workstation to the data processing apparatus so that information displayed on the visual output means of the data processing apparatus is also represented on said workstation display means for a vision-impaired user, said interface means being connected to the data bus of the data processing apparatus and comprising:

interface memory means for storing data; and data transfer controller comprising: means for sensing that particular data being transmitted on the data processing apparatus data bus is directed to the visual output means, means for feeding the sensed data which is directed to the visual output means from the data bus to said interface memory means so as to store said sensed data in said interface memory means, means for sensing the cessation of said data transmission on the data bus to the visual output means, and means for causing the data stored in said interface memory means to be fed, after said cessation of data transmission, to said display means for representation by said display means for recognition by a vision-impaired user.

2. A computer workstation in accordance with claim 1, wherein said data transfer controller comprises an address decoder unit for sensing said transmission and said cessation of transmission of data to the visual output means on the data bus and for causing said interface memory means to receive said sensed data from the data bus during said transmission and to cause feeding of said sensed data from said interface memory means to said display means after said cessation of data transmission.

3. A computer workstation for a vision-impaired user for connection to a data processing apparatus which includes a microprocessor, data input means, memory storage means, visual output means and at least a data bus connecting said microprocessor, data input means, memory storage means and visual output means for transmission of data therebetween, said workstation comprising:
- a workstation microprocessor;
- main memory means for storing data:
- display means for representing at least one of auditory, visual and tactile information for recognition by a vision-impaired user; and
- interface means for connecting said workstation to the data processing apparatus so that information displayed on the visual output means of the data processing apparatus is also represented on said workstation display means for a vision-impaired user, said interface means being connected to the data bus of the data processing apparatus and comprising:
- interface memory means for storing data; and
- data transfer controller comprising: means for sensing that particular data being transmitted on the data processing apparatus data bus is directed to the visual output means, means for feeding the sensed data which is directed to the visual output means from the data bus to said interface memory means so as to store said sensed data in said interface memory means, means for sensing the cessation of said data transmission on the data bus to the visual output means, and means for causing the data stored in said interface memory means to be fed, after said cessation of data transmission, to said display means for representation by said display means for recognition by a vision-impaired user, wherein said interface means synchronizes said feeding of sensed data from the data bus with said feeding of the data stored in said interface memory means to said display means, and wherein said data transfer means comprises an address decoder for sensing said transmission and said cessation of transmission of data to the visual output means on the data bus and for causing said interface memory means to receive said sensed data from the data bus during said transmission and to feed said sensed data from said interface memory means to said display means after said cessation of data transmission.

4. A computer workstation in accordance with claim 1, wherein said interface means synchronizes said feeding of sensed data from the data bus with said feeding of the data stored in said interface memory means to said display means.

5. A computer workstation for a vision-impaired user for connection to a data processing apparatus which includes a microprocessor, data input means, memory storage means, visual output means and at least a data bus connecting said microprocessor, data input means, memory storage means and visual output means for transmission of data therebetween, said workstation comprising:
- a workstation microprocessor;
- main memory means for storing data:
- display means for representing at least one of auditory, visual and tactile information for recognition by a vision-impaired user; and
- interface means for connecting said workstation to the data processing apparatus so that information displayed on the visual output means of the data processing apparatus is also represented on said workstation display means for a vision-impaired user, said interface means being connected to the data bus of the data processing apparatus and comprising:
- interface memory means for storing data; and
- data transfer controller comprising: means for sensing that particular data being transmitted on the data processing apparatus data bus is directed to the visual output means, means for feeding the sensed data which is directed to the visual output means from the data bus to said interface memory means so as to store said sensed data in said interface memory means, means for sensing the cessation of said data transmission on the data bus to the visual output means, and means for causing the data stored in said interface memory means to be fed, after said cessation of data transmission, to said display means for representation by said display means for recognition by a vision-impaired user, wherein said data transfer means comprises an address decoder for sensing said transmission and said cessation of transmission of data to the visual output means on the data bus and for causing said interface memory means to receive said sensed data from the data bus during said transmission and to feed said sensed data from said interface memory means to said display means after said cessation of data transmission,
wherein the data processing apparatus comprises a personal computer and the visual output means comprises a video controller for receiving data from the data bus and visual output means for displaying information under control of the video controller, and wherein said address decoder senses data being transmitted on the data bus to the video controller of the personal computer.

6. A computer workstation in accordance with claim 3, wherein the data processing apparatus comprises a personal computer and the visual output means comprises a viedeo controller for receiving data from the data bus and visual output means for displaying information under control of the video controller, and wherein said address decoder senses data being transmitted on the data bus to the video controller of the personal computer.

7. A computer workstation in accordance with claim 1, wherein the data processing apparatus includes a housing and said interface means is constructed as a plug-in board in the housing of the data processing apparatus.

8. A computer workstation in accordance with claim 2, wherein the data processing apparatus includes a housing and said interface means is constructed as a plug-in board in the housing of the data processing apparatus.

9. A computer workstation in accordance with claim 3, wherein the data processing apparatus includes a housing and said interface means is constructed as a plug-in board in the housing of the data processing apparatus.

10. A computer workstation in accordance with claim 4, wherein the data processing apparatus includes a housing and said interface means is constructed as a plug-in board in the housing of the data processing apparatus.

11. A computer workstation in accordance with claim 5, wherein the data processing apparatus includes a housing and said interface means is constructed as a plug-in board in the housing of the data processing apparatus.

12. A computer workstation in accordance with claim 6, wherein the data processing apparatus includes a housing and said interface means is constructed as a plug-in board in the housing of the data processing apparatus.

13. A computer workstation in accordance with claim 1, wherein said data input means of the data processing apparatus comprises a keyboard, and said interface means is located in the keyboard of the data processing means.

14. A computer workstation in accordance with claim 2, wherein said data input means of the data processing apparatus comprises a keyboard, and said interface means is located in the keyboard of the data processing means.

15. A computer workstation in accordance with claim 3, wherein said data input means of the data processing apparatus comprises a keyboard, and said interface means is located in the keyboard of the data processing means.

16. A computer workstation in accordance with claim 4, wherein said data input means of the data processing apparatus comprises a keyboard, and said interface means is located in the keyboard of the data processing means.

17. A computer workstation in accordance with claim 5, wherein said data input means of the data processing apparatus comprises a keyboard, and said interface means is located in the keyboard of the data processing means.

18. A computer workstation in accordance with claim 6, wherein said data input means of the data processing apparatus comprises a keyboard, and said interface means is located in the keyboard of the data processing means.

* * * * *